March 12, 1946. R. H. GODDARD 2,396,321
APPARATUS FOR CONTROLLING ACCELERATION AND DECELERATION IN AIRCRAFT
Filed July 8, 1940 2 Sheets-Sheet 1
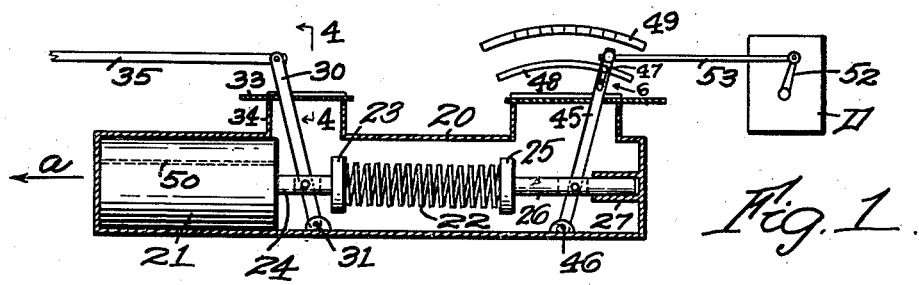
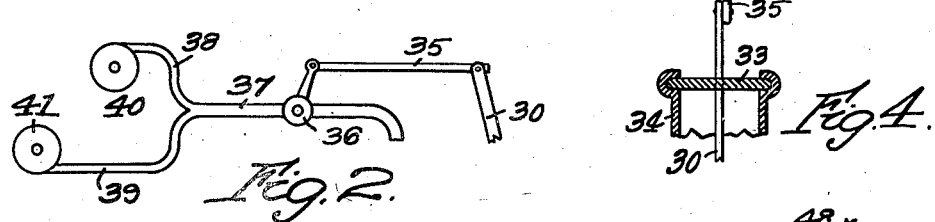
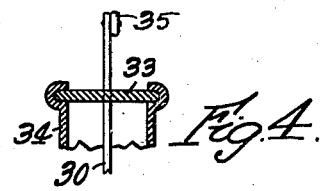
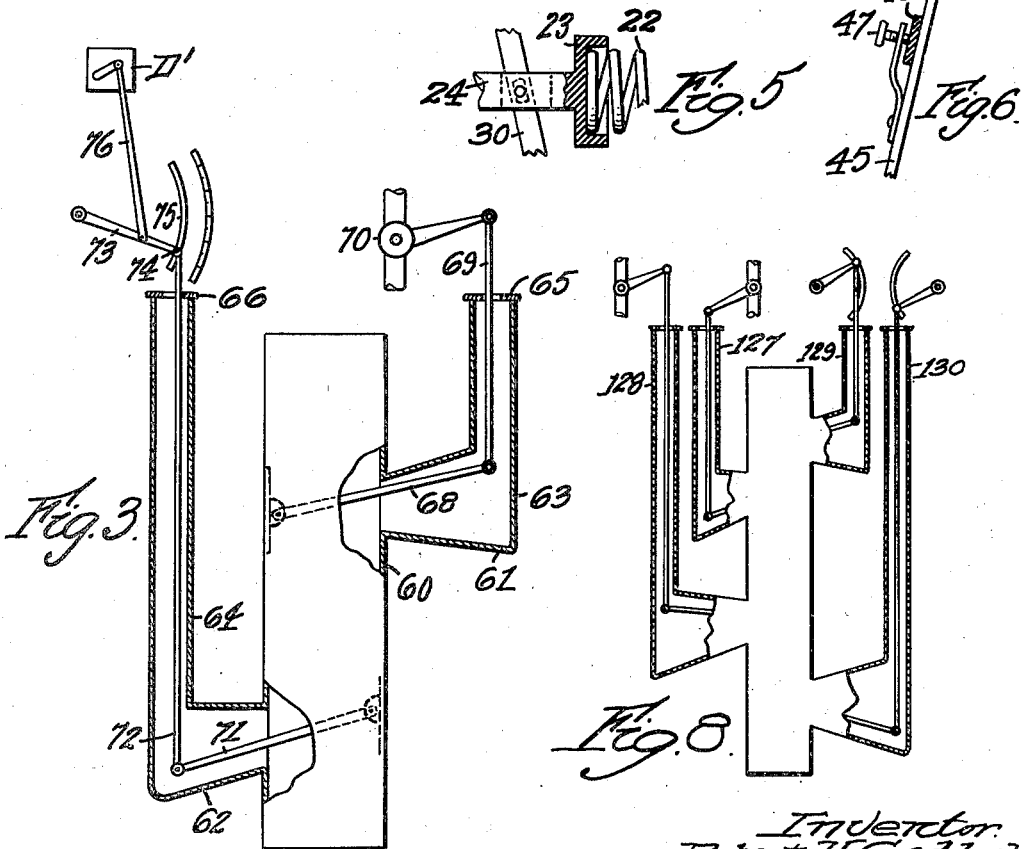
Inventor
Robert H. Goddard

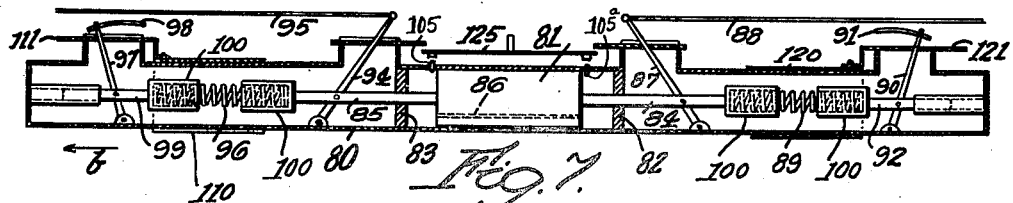
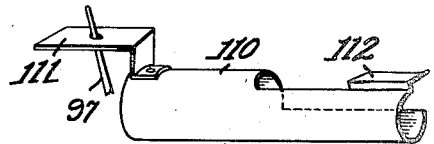
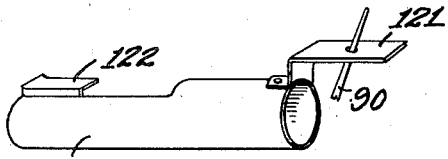
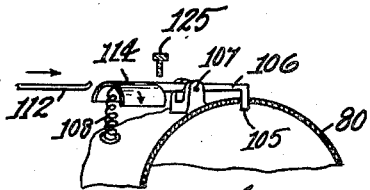
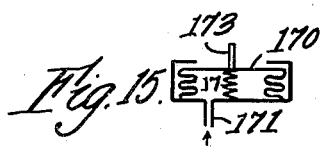
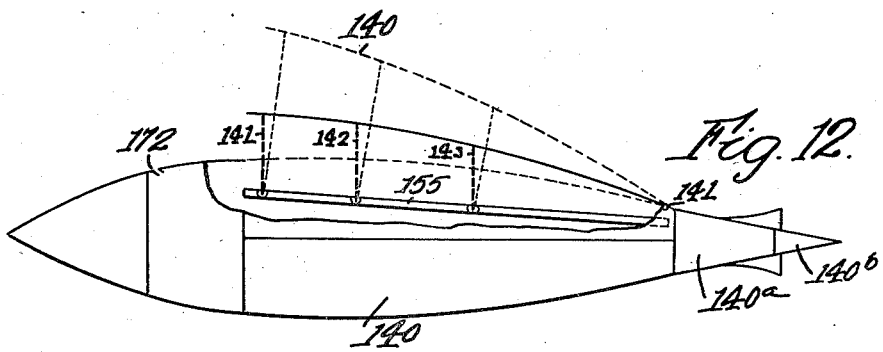
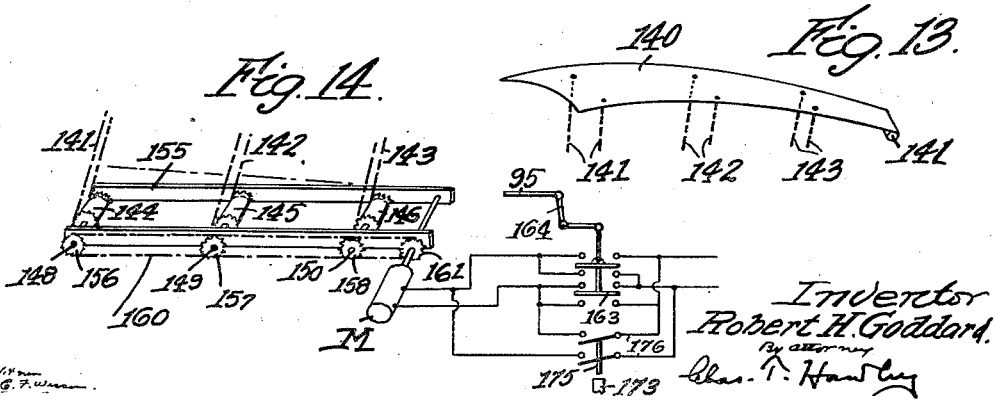

Patented Mar. 12, 1946

2,396,321

UNITED STATES PATENT OFFICE 2,396,321

APPARATUS FOR CONTROLLING ACCELERATION AND DECELERATION IN AIRCRAFT

Robert H. Goddard, Roswell, N. Mex., assignor of one-half to The Daniel and Florence Guggenheim Foundation, New York, N. Y., a corporation of New York Application July 8, 1940, Serial No. 344,327

8 Claims. (Cl. 244—76)

This invention relates to aircraft generally, but more particularly to aircraft propelled in whole or in part by one or more rocket blasts, produced by continuous or rapidly intermittent combustion. It is desirable to accurately control acceleration and deceleration in such aircraft, so that fuel will not be wasted in overcoming excessive air resistance and so that the time required for attaining full speed or for reducing speed for safe landing will be scientifically controlled for maximum efficiency.

To the attainment of this general object, I provide improved apparatus to automatically control and limit acceleration in an aircraft and I provide additional devices to similarly control and limit deceleration.

My invention further relates to arrangements and combinations of parts which will be hereinafter described and more particularly pointed out in the appended claims.

A preferred form of the invention is shown in the drawings, in which

Fig. 1 is a sectional side elevation of a device for controlling acceleration;

Fig. 2 is a detail plan view to be described;

Fig. 3 is a front elevation, partly in section, showing my invention adapted for control of vertical flight;

Fig. 4 is an enlarged detail sectional view, taken along the line 4—4 in Fig. 1;

Fig. 5 is an enlarged sectional side elevation of certain parts shown in Fig. 1;

Fig. 6 is a detail view, partly in section and looking in the direction of the arrow 6 in Fig. 1;

Fig. 7 is a sectional side elevation of apparatus for controlling both acceleration and deceleration;

Fig. 8 is a front view, partly in section, showing the apparatus of Fig. 7 adapted for vertical flight;

Figs. 9 and 10 are perspective views of devices for unlocking the automatic control apparatus;

Fig. 11 is a perspective view of a locking device;

Fig. 12 is a side elevation of a rocket craft embodying special devices for effecting deceleration;

Fig. 13 is a perspective view of a decelerating vane;

Fig. 14 is a perspective view of mechanism for operating a decelerating vane; and Fig. 15 is a sectional view of a device to control the automatic closing of the decelerating vanes.

Referring to Figs. 1 to 6, I will first describe the apparatus for controlling acceleration. For this purpose, I provide a control unit fixed in the aircraft and comprising a cylindrical casing 20, preferably positioned with its longitudinal axis parallel to the longitudinal axis and line of flight of the aircraft.

A relatively heavy piston 21 is slidable axially in the casing 20, but such sliding movement is opposed by a compression coil spring 22 mounted between a cup 23 on a piston rod 24 and a cup 25 on a rod or plunger 26 slidable in a fixed sleeve or bearing 27.

A lever 30 is pivotally connected at 31 to the casing 20 and has a pin-and-slot connection to the piston rod 24. The lever 30 extends upward through an opening in a plate 33 (Fig. 4) slidable in an elongated casing projection 34. At its outer end, the lever 30 is connected to a link 35 (Fig. 1), through which the flight-producing power of the rocket apparatus may be controlled. For purposes of illustration, I have shown the link 35 (Fig. 2) connected to operate a valve 36 which controls the flow of air or steam through a supply pipe 37 and branch pipes 38 and 39 to turbines 40 and 41 which operate pumps to feed gasoline and liquid oxygen respectively to a combustion chamber (not shown). This type of propulsion apparatus forms no part of my present invention but is disclosed in detail in a copending application Serial No. 327,257, filed by me April 1, 1940.

A lever 45 is similarly pivoted at 46 to the casing 20 and has a pin-and-slot connection to the rod 26. The upper end of the lever is provided with a clamping screw 47 (Fig. 6) which coacts with a fixed segmental bar 48 to hold the lever 45 in a predetermined and manually selected position. The position to which the lever 45 is adjusted is indicated by a fixed scale 49, which may be graduated in any desired acceleration units.

The operation of the mechanism thus far described is as follows:

Assuming that the direction of flight is in the direction indicated by the arrow $a$ in Fig. 1, it will be obvious that as the craft is accelerated, the relatively heavy slidable piston 21 will lag behind the movement of the craft, due to inertia, and will thus tend to slide to the right in the casing 20, such movement, however, being yieldingly resisted by the spring 22. A small bleed opening or passage 50 through the piston 21 prevents stalling of the apparatus by atmospheric pressure and also provides a "dashpot" effect which smoothes out or prevents undesired fluctuations in the movement of the piston.

The piston 21 in its sliding movement actuates the lever 30 to vary the setting of the valve 36 or to otherwise limit the acceleration of the aircraft to be controlled.

As the acceleration increases, the control effect also increases and the force of the rocket blast is reduced until the craft is gaining speed at a limited and predetermined acceleration only. This limiting acceleration will be that previously established by the setting of the lever 45.

If the lever 45 is moved further to the left, the compression of the spring 22 will be increased. Movement of the lever 30 and connected parts, due to a given acceleration, will then be reduced and the apparatus will adjust itself for a higher rate of acceleration.

Any desired automatic or timing devices as D may be connected by an arm 52 and link 53 to the lever 45. If the clamping screw 47 is then released, the device D will operate automatically to shift the device 45 a predetermined amount at a predetermined time, without manual supervision.

If the movements of the piston 21 and lever 30 are excessive, it may be necessary to supply oil in place of air in the casing 20 to produce an increased damping effect. The projections 34 and slide plates 33 are provided to prevent splashing and overflow of oil thus used.

If the apparatus is to be used to control vertical flight, the construction shown in Fig. 3 may be provided, in which the casing 60 is provided with outwardly enlarged projections 61 and 62 and risers 63 and 64 covered by sliding plates 65 and 66. The lever 68, link 69 and valve 70 operate exactly as shown in Figs. 1 and 2, but the lever 71 which predetermines the acceleration is connected by a link 72 to a second lever 73 having a clamping screw 74 engaging a segmental bar 75. The parts 72 to 75 are provided to bring the manual adjustment above the oil-retaining projection 62 and riser 64. An automatic device D' may be connected to the lever 73 by a link 76 as in the form previously described.

The mechanism thus far described provides effective means for controlling acceleration and for limiting acceleration to a predetermined amount, which amount however, may be varied by manual or automatic adjustment of the lever 45 and the corresponding degree of compression of the spring 22.

In Figs. 7 to 10 I have shown a combined apparatus for controlling and limiting both acceleration and deceleration. Referring to Fig. 7, I have shown a cylindrical casing 80 which is to be disposed parallel to the axis of the aircraft to be controlled, and having a relatively heavy piston 81 slidable between partitions 82 and 83 and provided with piston rods 84 and 85 and with a bleed opening 86.

The rod 84 has a pin-and-slot connection to a lever 87 connected to a link 88 adapted to control a valve, as 36 (Fig. 2), or to otherwise control the flight-producing rocket blast in an aircraft. A compression spring 89 yieldingly opposes movement of the piston 81 and lever 87 to the right. The degree of compression of the spring 89 may be adjusted by a lever 90, adapted to be clamped to a segment bar 91 and having a pin-and-slot connection to a slidable rod 92. This part of the apparatus controls and limits the rate of acceleration, all as previously described.

For similarly controlling and regulating deceleration, the piston rod 85 has a pin-and-slot connection to a lever 94, preferably connected by a link 95 to devices to be described by which deceleration may be controlled. A compression spring 96 yieldingly opposes movement of the piston 81 and lever 94 to the left in Fig. 7, and the amount of compression of the spring 96 may be adjusted by a lever 97, adapted to be clamped to a segment bar 98 and having a pin-and-slot connection to a slidable rod 99 against which the spring 96 is seated.

Each of the rods 84, 85, 92 and 99 is provided with a deep cup-like end member 100 in which the springs 89 and 96 are seated and retained. When the piston 81 is moved toward one end of the casing 80, the spring 89 or 96 at the opposite end of the casing is released from pressure and becomes substantially inoperative, but is held from displacement by the deep cup-shaped end members 100 in which it is mounted.

Assuming that the direction of flight is to the left, as indicated by the arrow b in Fig. 7, acceleration of the craft will cause the piston 81 to move relatively to the right, compressing the spring 89, and deceleration will correspondingly cause the piston 81 to move relatively to the left, compressing the spring 96. The rates at which acceleration and deceleration will be stabilized will be determined by the setting of the levers 90 and 97.

It is desirable that the piston 81 should not move away from the lever 90 or 97 during the setting thereof, and I accordingly provide locking pins 105 and 105a (Figs. 7 and 11), which pins are formed at the ends of levers 106 (Fig. 1) pivoted to the casing 80 at 107 and each yieldingly moved to locking position by a spring 108.

I also provide the pin-releasing devices shown in Figs. 9 and 10. One of these devices comprises a sleeve 110 (Fig. 9) loosely slidable on the outside of the casing 80 and connected at one end to the sliding cover plate 111 through which the lever 97 projects. At its opposite end, the sleeve 110 is provided with a cam plate 112 adapted to engage and depress a curved plate 114 (Fig. 11) on the free end of the associated lever 106.

If the lever 97 is swung to the right in Fig. 7 to set the apparatus for a selected rate of deceleration, such movement will also cause the sleeve 110 to be moved to the right, advancing the cam plate 112 to depress the plate 114 and move the pin 105 to withdrawn or unlocking position. At the same time, the pin 105a at the right-hand end of the piston 81 remains in locking position, so that the piston will not be moved to the right by compression of the spring 96 during the setting of the lever 97.

Similarly, when the lever 90 is swung to the left to a selected setting for acceleration, an associated sleeve 120 will be moved by the cover plate 121 and will advance a cam plate 122 to withdraw the locking pin 105a, thus freeing the piston 81 for movement to the right to control acceleration.

The apparatus shown in Fig. 7 may thus be used to control acceleration only or deceleration only or to control both acceleration and deceleration.

If the device is to be used merely for indicating the rate of acceleration or deceleration but without controlling the same, the pins 105 and 105a may both be withdrawn by manually depressing a release bar 125 (Figs. 7 and 11) which engages both levers 106 behind their pivots 107. If the apparatus shown in Fig. 7 is to be used for vertical flight, risers 127, 128, 129 and 130 (Fig. 8) may be provided, which correspond in structure and function to the risers 63 and 64 in Fig. 3. Additional links and levers are also provided as previously described.

Special means for controlling deceleration is shown in Figs. 12 to 15 inclusive. Deceleration is not readily controlled by changes in the rocket blast, unless the blast is reversed and directed forward which involves mechanical complications and is also very wasteful in fuel.

Accordingly, I effect deceleration by providing a plurality of wedge-shaped vanes or casing segments 140 (Fig. 12), each pivoted at 141 in the rear portion of the aircraft and extending forward substantially to the point of greatest craft diameter. In normal flight, the vanes 140 are held firmly seated and form a part of the streamlined casing.

In the preferred construction, four vanes are used, which collectively cover the entire circumference of the casing and constitute the entire surface thereof in the portion of the craft at which they are located.

The pivots 141 of the vanes are located as far rearward as possible, and the vanes 140 extend substantially to the non-streamline and non-stationary rearmost parts of the casing, such as the movable tail-piece 140ª, which may operate as described in my prior Patent No. 2,183,311 and which may also have rearwardly projectable plates 140ᵇ to cover the rear end of the rocket discharge nozzle when the rocket blast is not in use, as described in my prior Patent No. 1,929,778. The vanes 140 thus exert the maximum decelerating effect.

When it is desired to use the vanes as a drag to reduce the speed, the vanes are allowed to open outward at their forward ends to a greater or less extent, depending on the speed of the craft and on the density of the atmosphere. Each vane is preferably controlled by pairs of chains 141, 142 and 143 connected to winding drums 144, 145 and 146 mounted on cross shafts 148, 149 and 150, which shafts are rotatably supported in a frame 155. The shafts 148, 149 and 150 are provided with sprockets 156, 157 and 158, engaged by a chain 160 driven by a motor M through a driving sprocket 161. The diameters of the drums and sprockets are so related that the amount of chain given off or taken up at each winding drum will be proportioned to the distance of the drum from the fixed pivot 141 about which the vane swings.

The provision of the chains in pairs, with one chain of each pair attached near each edge of the vane, is important as it prevents the sidewise vibration or fluttering of the vane about its longitudinal axis which would occur if a single chain only, attached in the middle of the vane, were used. Furthermore, the use of several pairs of chains for each vane, attached at intervals in the length of the vane, is desirable to permit the use of lighter material for the vanes, thereby saving a substantial amount of weight which is of great importance in aircraft construction.

Usual driving connections are provided so that a single motor M will simultaneously open or close all of the vanes 140. The motor M is preferably reversible and is controlled through a reversing switch 163 having an operating arm 164 connected to the link 95 (Fig. 7) previously described.

For steering purposes during deceleration, it is desirable that an additional and separate adjustment be provided for each of the vanes. Each frame 155 is extended rearward and is pivoted at or adjacent the pivot 141 of its associated vane 140. When one of the vanes is to be separately adjusted for steering purposes, its frame 155 is swung outward or inward under the control of the operator, but without interfering with subsequent simultaneous adjustment of all of the vanes by the motor M.

When landing an aircraft with certain landing arrangements, it is necessary that the vanes 140 be closed before the craft can be landed. I have provided automatic means for thus closing the vanes, which means preferably comprises a bellows 170 (Fig. 15), the interior of which is connected by a pipe 171 to an opening 172 in the front part of the aircraft casing. A pin 173 mounted on the bellows 170 engages and closes a switch 175 (Fig. 14) when the bellows is inflated. The switch 175 controls a circuit through wires 176 to cause the motor M to be operated in a direction to wind up the chains 141, 142 and 143 and thus close the vanes 140. A spring 17 tends to deflate the bellows.

At high altitudes, the pressure applied through the opening 172 and pipe 171 is not sufficient to overcome the spring 17 and inflate the bellows 170, but as the craft approaches the earth and encounters a relatively dense atmosphere, the pressure will increase sufficiently to close the switch and cause the motor to close the vanes.

I thus automatically insure that the vanes will be closed as the craft approaches the earth when a landing is to be made.

Having described the details of construction and the method of operation of my improved apparatus, it is believed that the uses and advantages thereof will be readily apparent.

The structure shown in Fig. 1 may be set, either manually or automatically, to control the rate of acceleration of an aircraft and also to vary this rate when desired. The apparatus shown in Fig. 7 may be similarly set and used to control both acceleration and deceleration, and in the latter case the mechanism shown in Figs. 12 to 14 may be used to advantage to provide the decelerating effect.

Having thus described my invention and the advantages thereof, I do not wish to be limited to the details herein disclosed, otherwise than as set forth in the claims, but what I claim is:

1. In an aircraft, a casing, a plurality of forwardly-opening vanes circumferentially arranged on said casing and extending rearward from the point of greatest diameter thereof, automatic means under inertia control effective to release all of said vanes simultaneously for outward movement or to swing all of said vanes inward, in respective response to a decrease or an increase in the rate of deceleration of said craft, and automatic means to close all of said vanes simultaneously under control of the atmospheric density and in response to a predetermined increase in atmospheric density.

2. In an aircraft, a casing, a plurality of forwardly-opening vanes circumferentially arranged on said casing and extending substantially rearward from the point of greatest diameter thereof, means hingedly mounting each vane to the casing, automatic means to simultaneously extend or retract all of said vanes for deceleration control, and a separate support for each of said vanes mounted for independent movement under manual control to effect outward displacement of a selected vane to alter the course of said craft while maintaining the automatic control of all of said vanes fully operative.

3. In an aircraft having rocket means to produce flight and a valve to control the supply of combustion liquids to said rocket means, that improvement which consists in providing control means for said valve effective to maintain uniform acceleration of said aircraft and including an inertia-actuated element mounted for movement parallel to the longitudinal axis of the craft and which performs substantial mechanical longitudinal movements in proportionate response to changes in the rate of acceleration of said craft, and a direct mechanical connection between said inertia-actuated element and said valve, through which connection said inertia-actuated element, on an increase or decrease in the rate of acceleration of said aircraft, proportionately closes or opens said valve and proportionately reduces or increases the flight-producing effect of said rocket means.

4. In an aircraft, rocket means to produce flight, separate air-resistant means to retard flight, a movable inertia-actuated element, connections through which said inertia-actuated element controls said rocket means and limits acceleration, and connections through which said inertia-actuated element controls said separate air-resistant retarding means and limits deceleration.

5. In an aircraft having power means to effect acceleration and a second and separate means to effect deceleration, a control apparatus for said first power means and for said second means comprising a single inertia-actuated element, a spring resisting movement of said element in one direction for acceleration control, a second spring resisting movement of said element in the opposite direction for deceleration control, separate locking devices to prevent movement of said inertia-actuated element in each direction, separate means to determine the rates of acceleration and of deceleration to be maintained and each having a zero position, and release devices for said locking devices, each release device being operative to release its associated locking device when the associated rate-determining means is displaced from its zero position.

6. In an aircraft having power means to effect acceleration and a second and separate means to effect deceleration, a control apparatus for said first power means and for said second means comprising a single inertia-actuated element, a spring resisting movement of said element in one direction for acceleration control, a second spring resisting movement of said element in the opposite direction for deceleration control, separate devices to determine the rates of acceleration and deceleration and each having a zero position, separate locking means to prevent movement of said inertia-actuated element in each direction, and means to release said inertia-actuated element for movement toward a rate-determining device which is displaced from its zero position.

7. In an aircraft having power means to effect acceleration and a second and separate means to effect deceleration, a control apparatus for said first power means and for said second means comprising a single inertia-actuated element, a spring resisting movement of said element in one direction for acceleration control, a second spring resisting movement of said element in the opposite direction for deceleration control, separate locking devices to prevent movement of said inertia-actuated element in each direction, separate manual means to vary the resistance of each of said springs and each having a zero position, and a separate release device operable with each manual means to release an associated locking device when said manual means is displaced from its zero position.

8. In an aircraft having power means to effect acceleration and a second and separate means to effect deceleration, a control apparatus for said first power means and for said second means comprising a single inertia-actuated element, a spring resisting movement of said element in one direction for acceleration control, a second spring resisting movement of said element in the opposite direction for deceleration control, a separate locking device to prevent movement of said inertia-actuated element in each direction, separate adjusting devices for varying acceleration and deceleration respectively, and separate release devices each associated with and actuated by one of said adjusting devices and operative when so actuated to release said inertia-actuated element for movement in a predetermined direction.

ROBERT H. GODDARD.